United States Patent
Sevart et al.

(10) Patent No.: US 7,124,629 B1
(45) Date of Patent: Oct. 24, 2006

(54) PREDICTION OF INTERNAL RIB IRREGULAR WEAR VIA RIB EDGE LATERAL SLIP

(75) Inventors: Jeffrey Leon Sevart, Akron, OH (US); John Michael Maloney, Uniontown, OH (US); Paul Keyer Blackiston, III, Massillon, OH (US); Richard Winfield Harden, Jr., Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/218,119

(22) Filed: Sep. 1, 2005

(51) Int. Cl.
*G01M 17/02* (2006.01)

(52) U.S. Cl. ..................................................... 73/146

(58) Field of Classification Search ................. 73/146, 73/146.2, 146.3; 33/335, 203; 340/438, 340/442, 443; 116/28 R, 34 R
See application file for complete search history.

(56) References Cited

U.S. PATENT DOCUMENTS

| | | | | |
|---|---|---|---|---|
| 3,933,036 A * | 1/1976 | Lippmann et al. | ............. | 73/146 |
| 5,249,460 A * | 10/1993 | Dory et al. | .................... | 73/146 |
| 5,357,799 A * | 10/1994 | Roth et al. | ..................... | 73/146 |
| 6,151,959 A * | 11/2000 | Cantu et al. | ................. | 73/146 |
| 6,606,902 B1 * | 8/2003 | Koeune et al. | ............... | 73/146 |
| 6,883,962 B1 * | 4/2005 | Kurata | ......................... | 374/57 |
| 6,959,593 B1 * | 11/2005 | Mancosu et al. | ............. | 73/146 |
| 2001/0022802 A1 * | 9/2001 | Kurata | ......................... | 374/45 |
| 2005/0061069 A1 * | 3/2005 | Robert | ......................... | 73/146 |

* cited by examiner

*Primary Examiner*—Eric S. McCall
(74) *Attorney, Agent, or Firm*—Howard M. Cohn

(57) ABSTRACT

The present invention relates to a method for predicting the propensity for a RMT steer tire to have irregular tire tread wear. The method comprises the steps of: providing a RMT steer tire to be tested; placing measurement points upon a ground engaging surface of selected circumferential tread ribs of the tread of the RMT tire; progressively rolling the RMT steer tire across a first planar side of a transparent plate whereby the progressive movement of a footprint image of the RMT steer tire is imposed upon the first planar side of the transparent plate; recording the progressive movement of the marked measurement points in the footprint image of the RMT steer tire imposed upon the first planar side of the transparent plate; determining the amount of lateral movement of each of the marked measurement points in the footprint image; and if any measurement points exhibit lateral movement beyond 0.060 inches, predicting that the RMT steer tire will have irregular tire tread wear.

9 Claims, 9 Drawing Sheets

PREDICTION OF INTERNAL RIB IRREGULAR WEAR VIA RIB EDGE LATERAL SLIP

TECHNICAL FIELD OF THE INVENTION

The present invention generally relates to automotive tire research. More specifically, the present invention relates to an improved method of predicting a tires propensity to experience irregular internal rib wear on Radial Medium Truck (RMT) steer tires in actual use.

BACKGROUND OF THE INVENTION

Radial medium truck (RMT) steer tires, in some cases, have been found to develop irregular internal rib wear. This undesirable condition can lead to early removal of tires from the vehicle. RMT steer tires typically have 4 to 6 solid ribs extending circumferentially about the tire. However, there can be any number of solid ribs. Internal rib wear generally happens very quickly if it is to be a problem. Steer tires that exhibit the irregular wear have been studied and compared to tires that have no history of developing such irregular wear in actual service. Data analysis has shown that internal rib wear on the RMT steer tires is related to high lateral slip and frictional energy acting upon the internal rib edges of the tire's tread at low severity conditions (zero lateral load). Lateral slip of the internal rib edges is believed to promote irregular wear mechanisms. The irregular wear begins as "river wear", where the edges of the rib start wearing rapidly The irregular wear later propagates across the rib until the whole rib is worn (resulting in depressed internal rib wear). However, while the underlying mechanism seems well understood, it is difficult to determine the point at which a tire reaches the borderline values of total slip and frictional energy that will develop into internal rib wear.

SUMMARY OF THE INVENTION

The present invention provides an empirical test method by which internal rib edge slip for a given tire tread design may be effectively measured using existing dynamic footprint measuring equipment.

According to the present invention, there is disclosed a method for predicting the propensity for a RMT steer tire to have irregular tire tread wear. The method comprises the steps of: providing a RMT steer tire to be tested; placing measurement points upon a ground engaging surface of selected circumferential tread ribs of the tread of the RMT tire; progressively rolling the RMT steer tire across a first planar side of a transparent plate whereby the progressive movement of a footprint image of the RMT steer tire is imposed upon the first planar side of the transparent plate; recording the progressive movement of the marked measurement points in the footprint image of the RMT steer tire imposed upon the first planar side of the transparent plate; determining the amount of lateral movement of each of the marked measurement points in the footprint image; and if any of the measurement points exhibit lateral movement while rolling through the footprint greater than 0.010 inches, predicting that the RMT steer tire will have irregular tire tread wear.

Further according to the present invention, the measurement points are to be placed adjacent to the inner and outer edges of any circumferential tread rib on the RMT steer tire.

Preferably, the measurement points are placed adjacent to the inner and outer edges of the in-board circumferential tread ribs of the RMT steer tire.

Still further according to the present invention, if any of the measurement points adjacent to the selected inner and outer edges of in-board circumferential tread ribs exhibit lateral movement greater than 0.010 inches, preferably greater than 0.008 inches, and most preferably greater than 0.006 inches, the result is the prediction of irregular tire tread wear.

Also according to the present invention, the RMT steer tire is progressively rolled across a first planar side of a transparent plate at the linear velocity of one mile per hour.

Further according to the present invention, the progressive movement of the RMT steer tire footprint image upon the first planar side of the transparent plate is photographically recorded from an opposite, second planar side of the transparent plate as the footprint traverses the transparent plate. Then the photographic recording is sent to a computer analysis system for analyzing the progressive translation movement of the marked measurement points through the footprint of the RMT steer tire.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements within selected drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199a, 199b, 199c, etc. Or, related but modified elements may have the same number but are distinguished by primes. For example, 109, 109', and 109" are three different elements which are similar or related in some way, but have significant modifications. Such relationships, if any, between similar elements in the same or different figures will become apparent throughout the specification, including, if applicable, in the claims and abstract.

Figure 1:
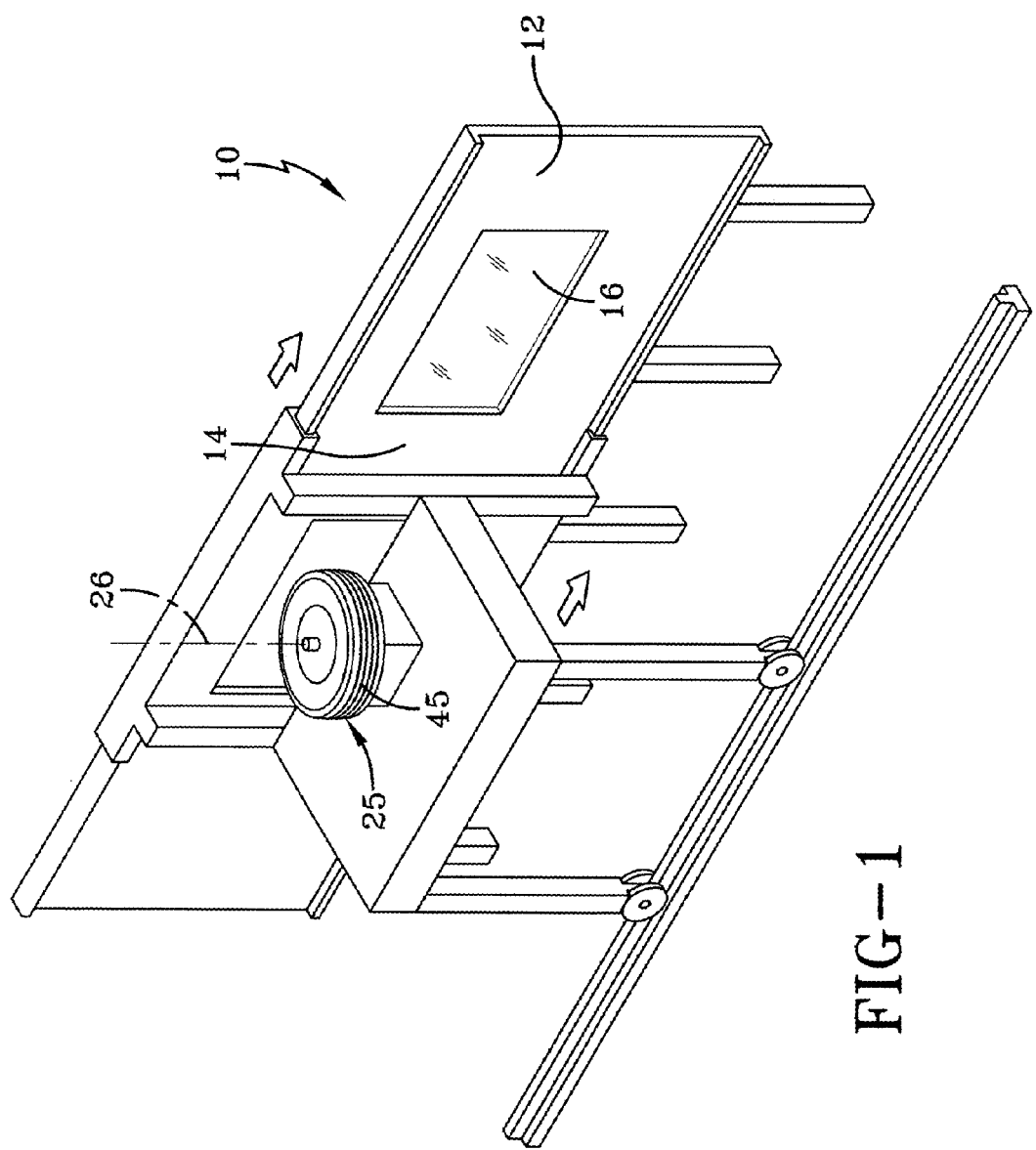
Figure 2:
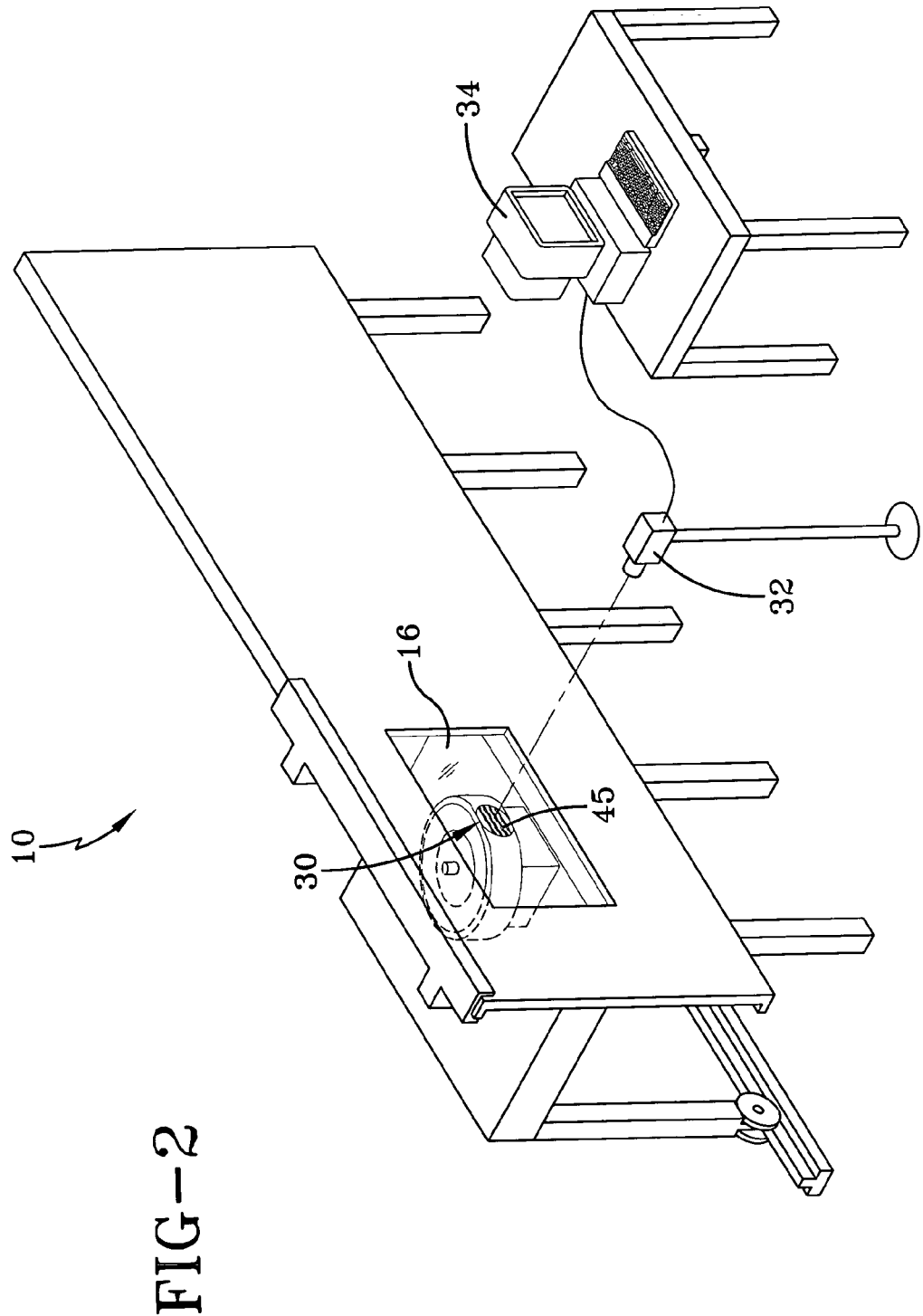
Figure 3:
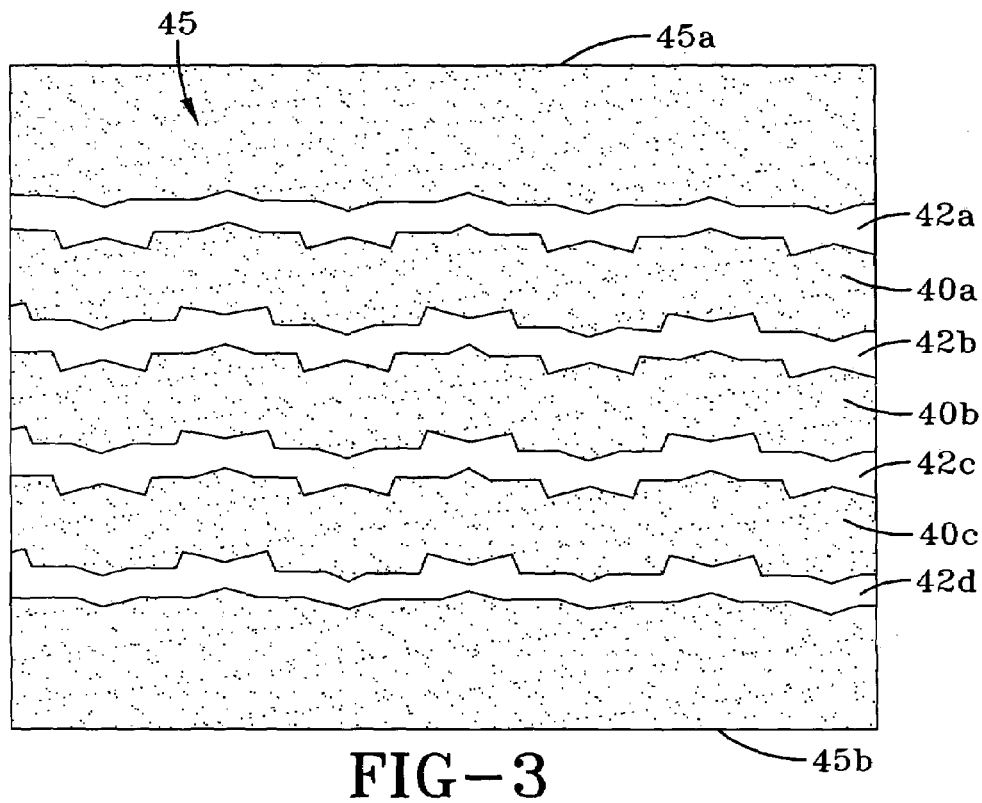
Figure 4:
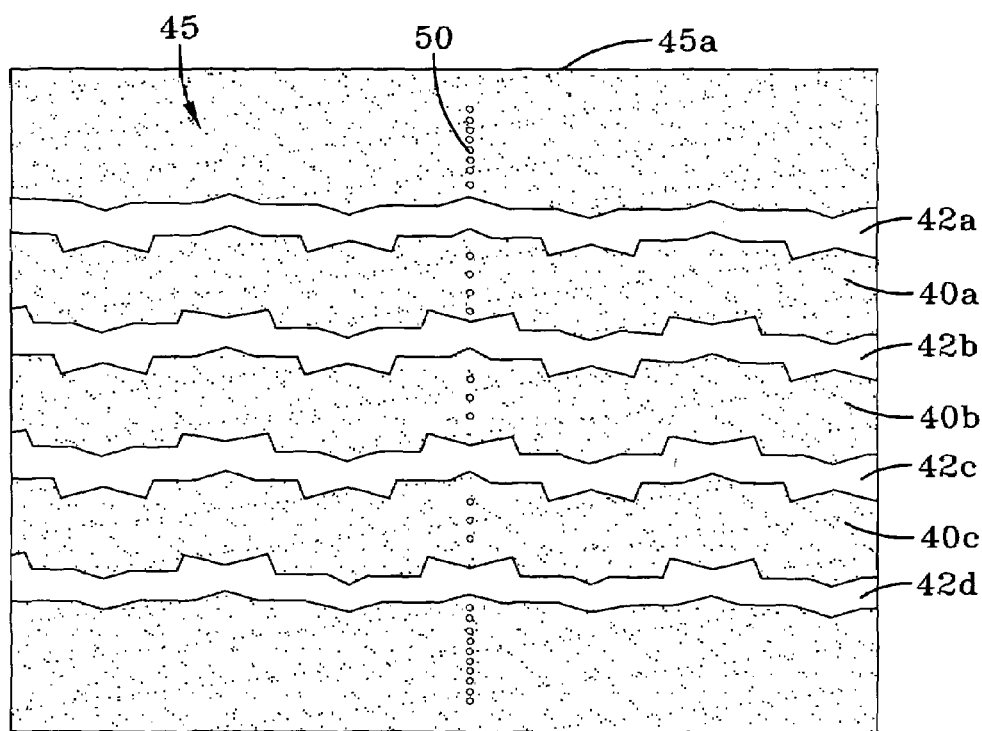
Figure 5:
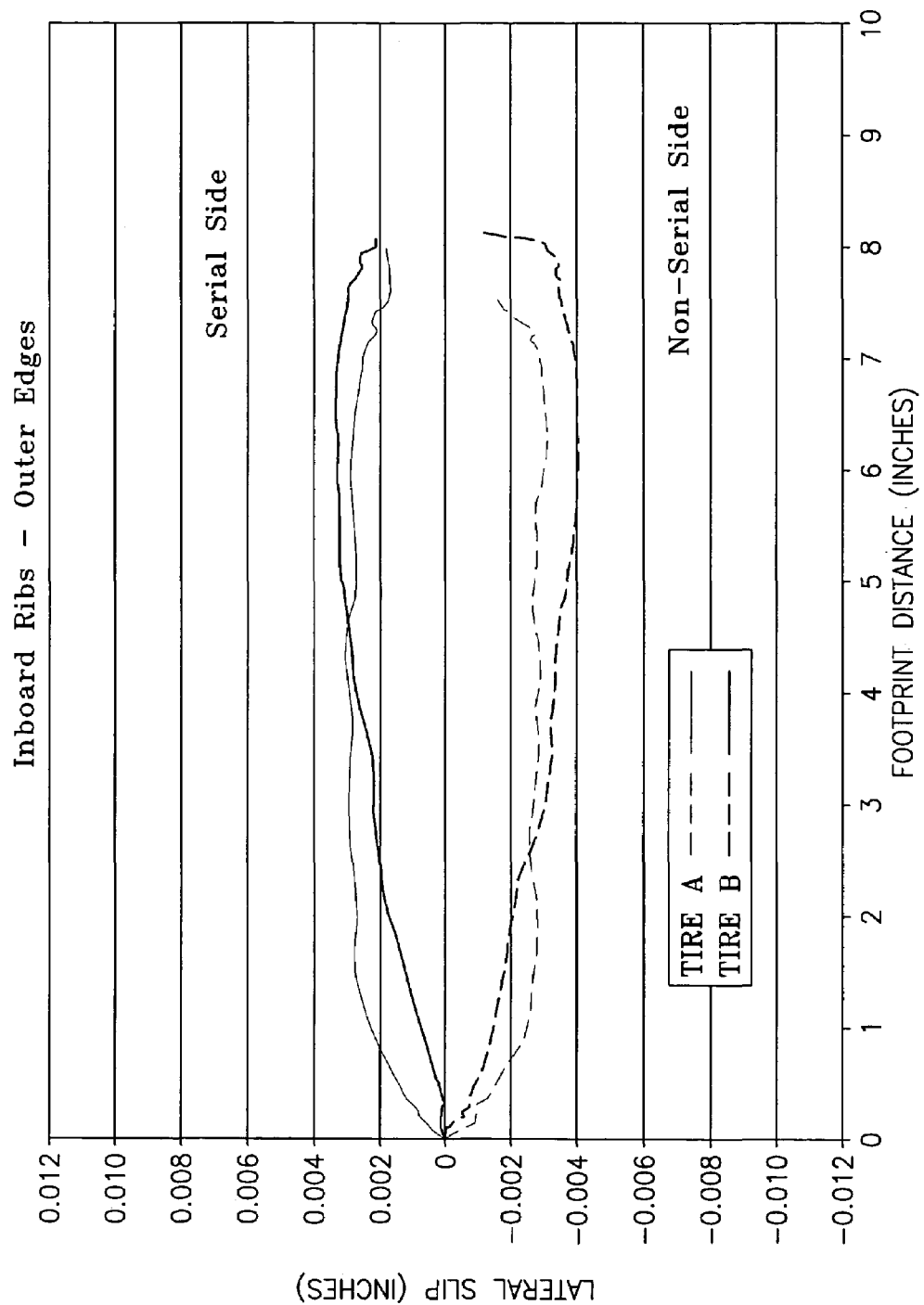
Figure 6:
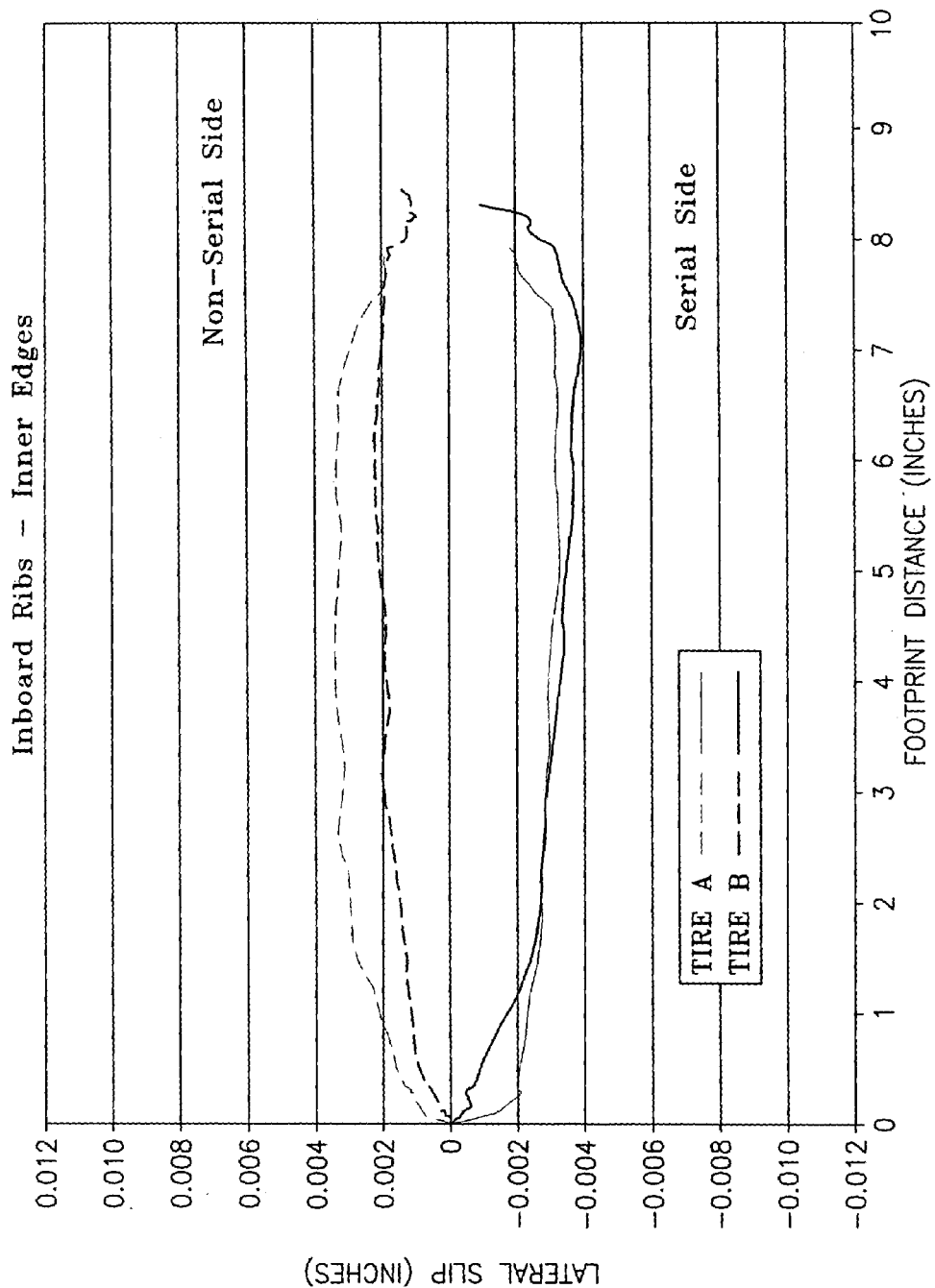
Figure 7:
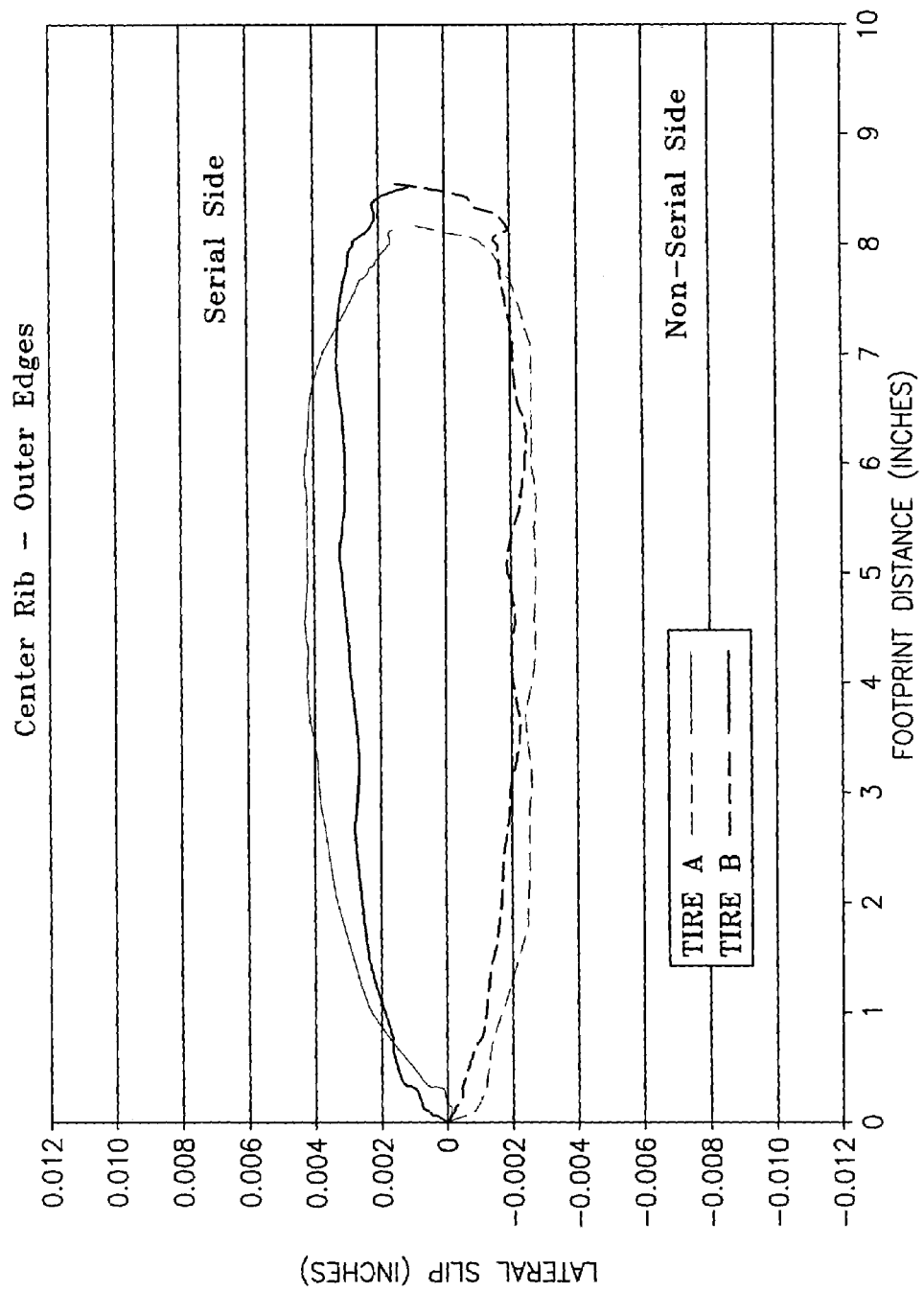
Figure 8:
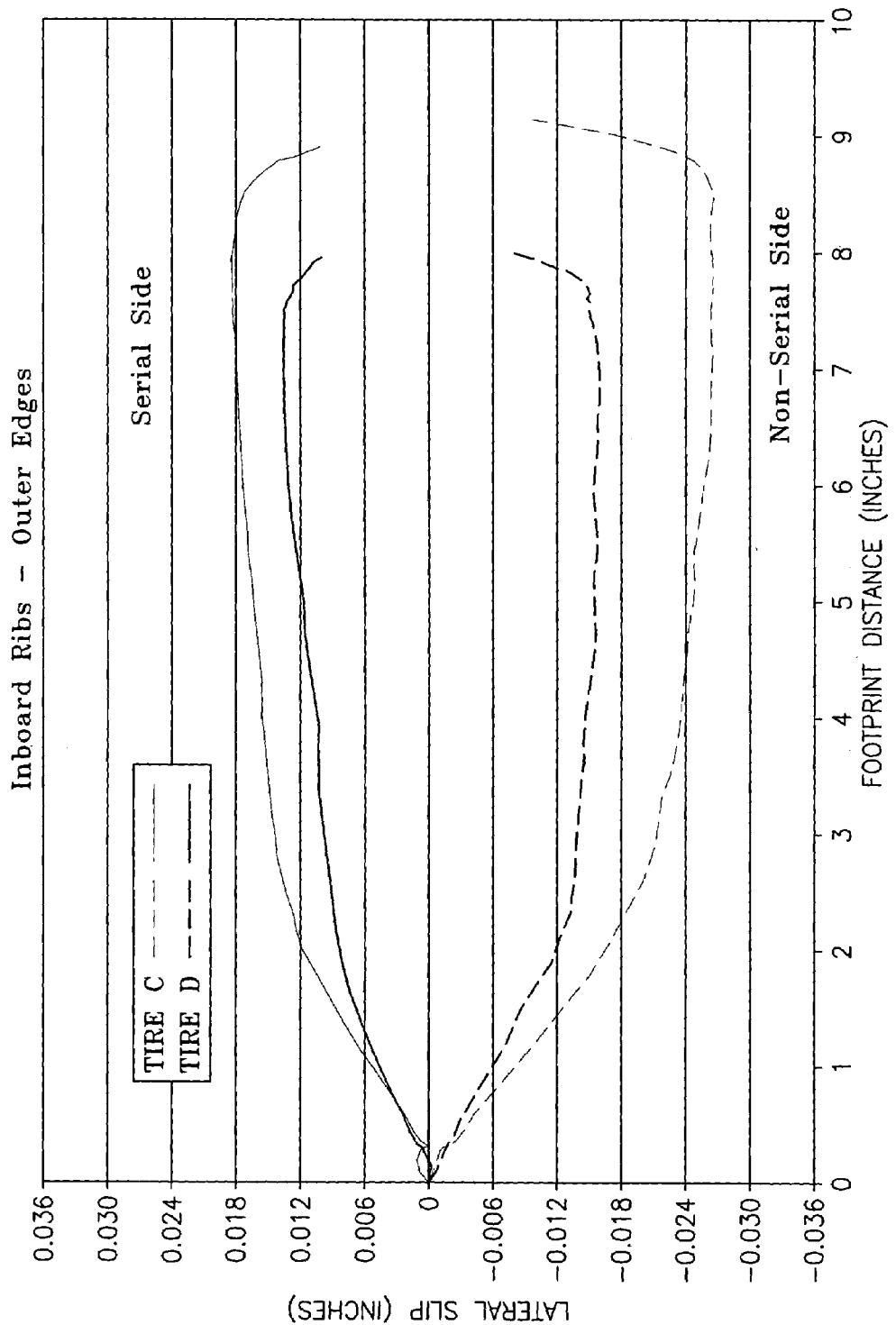
Figure 9:
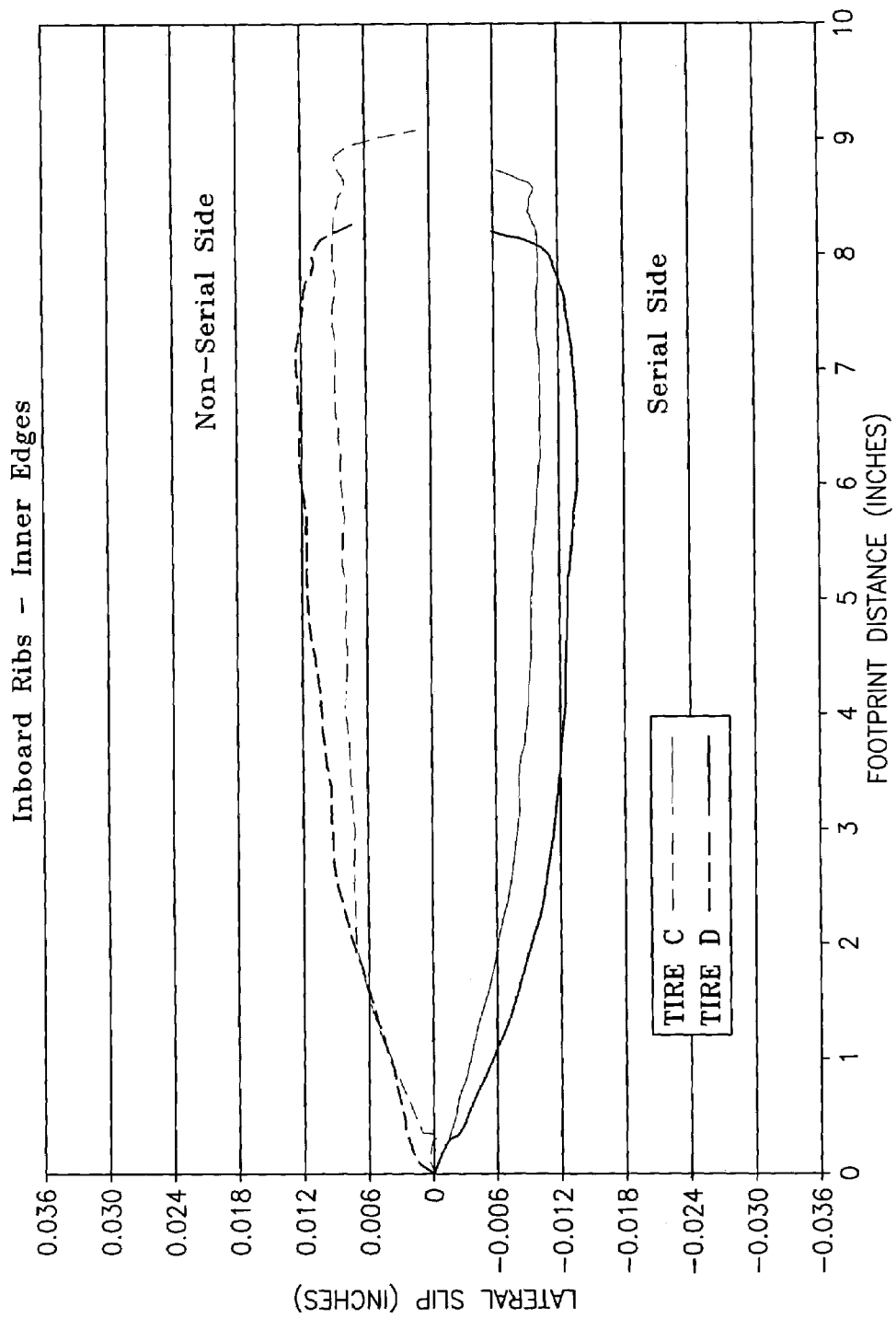
Figure 10:
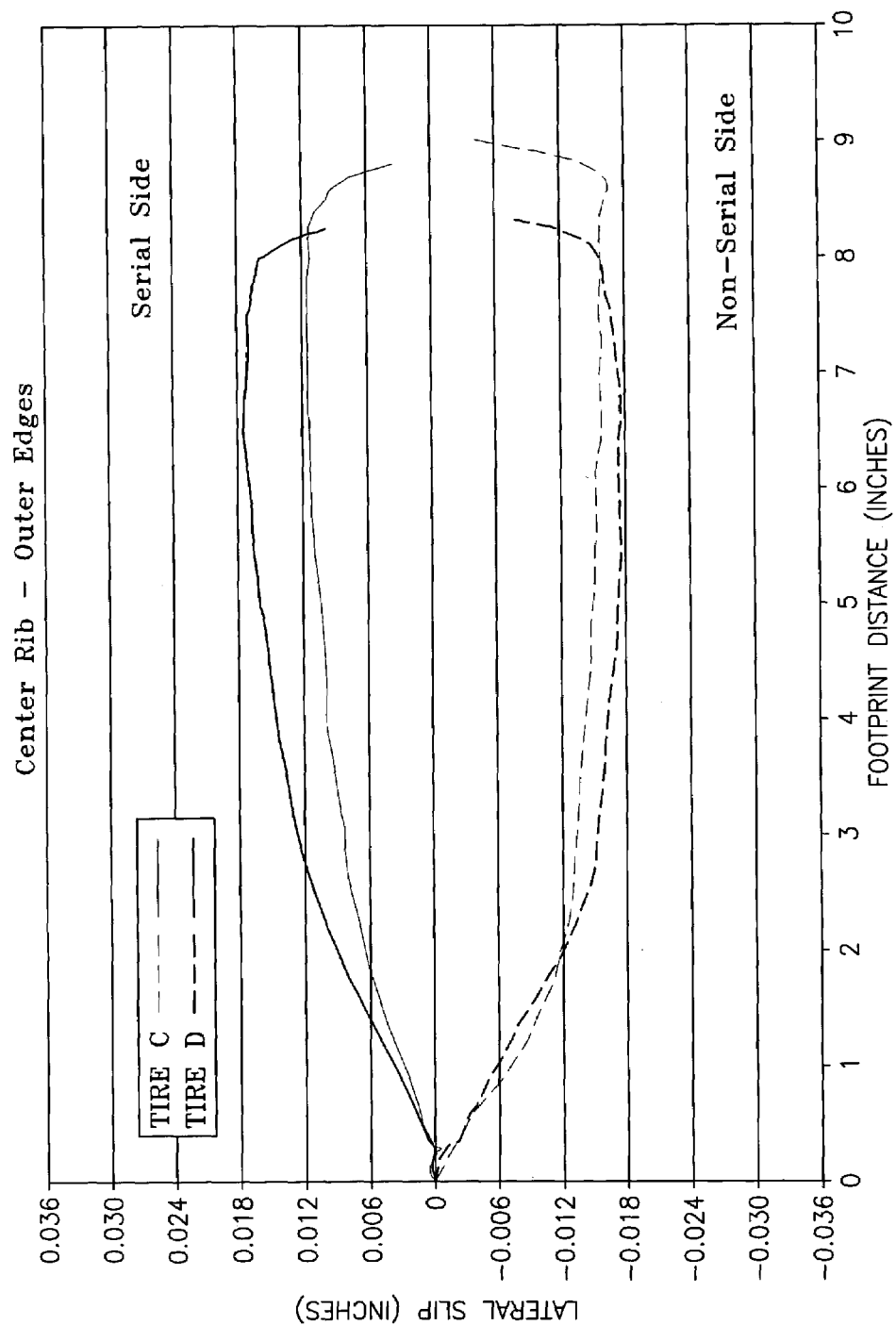

The structure, operation, and advantages of the present preferred embodiment of the invention will become further apparent upon consideration of the following description taken in conjunction with the accompanying drawings, wherein:

FIG. 1 presents a frontal, schematic view of a typical dynamic footprint machine as used in the tire industry:

FIG. 2 presents a schematic rear view of the dynamic footprint machine illustrated in FIG. 1;

FIG. 3 presents a typical tire foot print as viewed on the dynamic footprint machine illustrated in FIGS. 1 and 2;

FIG. 4 presents the tire footprint as illustrated in FIG. 3 and showing the measurement points at which slip measurements are measured;

FIG. 5 illustrates the Lateral Slip of the inboard ribs-outer edges for two sample tires which do not typically develop internal rib wear;

FIG. 6 illustrates the Lateral Slip of the inboard ribs-inner edges for two sample tires which do not typically develop internal rib wear;

FIG. 7 illustrates the Lateral Slip of the center ribs-outer edges for two sample tires which do not typically develop internal rib wear FIG. 8 illustrates the Lateral Slip of the inboard ribs-outer edges for two sample tires which do typically develop internal rib wear FIG. 9 illustrates the Lateral Slip of the inboard rib-inner edges for two sample tires which do typically develop internal rib wear; and FIG. 10 illustrates the Lateral Slip of the center rib-outer for two sample tires which do typically develop internal rib wear.

DETAILED DESCRIPTION OF THE INVENTION

The present invention is directed to solving the problem of determining whether a RMT steer tire will develop irregular, internal rib wear.

FIG. 1 schematically illustrates a prior art Dynamic Footprint Machine 10 of the type used in practicing the present invention. Dynamic Footprint Machine 10 basically comprises a vertically orientated footprint testing portion 12 having a vertically aligned, planer testing surface 14. A transparent, "see through" plate 16 is positioned within the testing surface plane 14. A mounting structure is provided to rotatably mount a tire so that it can engagingly roll horizontally across the testing surface plane 14.

A normally inflated test tire 25 is mounted on a vertical axis 26 and free to rotate thereabout. The tread of test tire 25 is engagingly rolled horizontally, at about one mile per hour, along testing surface 14 whereby test tire 25 rolls across transparent plate 16. As test tire 25 rolls across plate 16, the test tire's footprint 30 is fully visible on the opposite side of plate 16 as illustrated in FIG. 2. Thus the footprint 30 of test tire 25 may be optically observed and/or video photographed as it traverses across transparent plate 16 by a high speed video camera 32 or any other desirable photographic or graphic recording means. The image of the footprint is directed to a computer analysis system 34 which can also be connected to the Dynamic Footprint Machine 10.

It can be seen by studying Dynamic Footprint Machine data, that footprints of RMT steer tires exhibiting internal rib wear tendencies also exhibit lateral displacement (slip) of the tire tread's rib edges, from the center of the tire footprint to the entrance and exit regions of the tire footprint, as the tire traverses across the viewing area of the Dynamic Footprint Machine 10. In other words, when sighting down the tire rib in the footprint, rib edge slip appears as a curving of the rib edges outwardly at the footprint center.

RMT steer tires with irregular, internal rib wear tendencies have been observed to have a more extreme rib curvature than tires that do not have internal rib wear tendencies. The displacement of the rib edges through the tire footprint promotes high lateral stress and resulting lateral slip.

FIG. 3 presents a typical tire tread design 45 having circumscribing inner ribs 40a, 40b, and 40c with grooves 42a, 42b, 42c, and 42d cut therebetween. The outer or serial side shoulder 45a of tread design 45 is at the top of FIG. 3 and the inner or non-serial side shoulder 45b is at the bottom of FIG. 3.

As shown in FIG. 4, in preparation for testing a given tire tread for lateral rib edge slip on the Dynamic Footprint Machine 10, a series of selected measurement points 50 are marked with small white dots laterally across the ground engaging surface of circumferential ribs of the tire's tread and at selected locations immediately adjacent the edge of the tire's circumferential ribs. Note that the dots 50 are only formed on the ribs. Preferably about twenty five to sixty measurement points 50 are laterally spaced across the tire tread as illustrated in FIG. 4. Care is taken to place a portion of the measurement points (white dots) immediately adjacent the inner and outer rib edges (the edges disposed adjacent the grooves as illustrated in FIG. 4.

As test tire 25 rolls across transparent plate 16, footprint 30 is observed to move from right to left, as viewed in FIG. 2, across transparent plate 16. As footprint 30 moves across transparent plate 30 (from right to left in FIG. 2) the measurement points 50 (the small white marker dots), will be observed to move from right to left within the translating tire footprint 30. By video photographing footprint 30, as it translates across transparent plate 16, any lateral movement of the marker dots placed at the rib edges, with respect to the footprint, represents lateral rib edge slip and will be recorded by the video-photographs. The total lateral displacement of the measurement points, particularly those placed immediately adjacent the rib edges, can be calculated in the computer system 34 to determine the amount of lateral rib edge slip as a function of distance, either through the footprint or the circumference of the tire.

EXAMPLES

In the following examples, tests were conducted, using the method described before, on two series of RMT steer tires, one series that do not typically develop internal rib wear that and a second series that do typically develop internal rib wear, Example of RMT Steer Tires That Do Not Typically Develop Internal Rib Wear FIG. 5 illustrates the inboard ribs-outer edges of the two sample tires, Tire A and Tire B, which do not typically develop internal rib wear. Both sample tires have lateral slip at the edges that are below the limit of 0.006 inches. These slip values indicate a low potential for internal rib wear.

FIG. 6 illustrates the inboard ribs-inner edges of the same two sample tires, Tire A and Tire B, which do not typically develop internal rib wear. Both sample tires have lateral slip at the edges that are below the limit of 0.006 inches. These slip values also indicate a low potential for internal rib wear.

FIG. 7 illustrates the in center rib-outer edges of the same two sample tires, Tire A and Tire B, which do not typically develop internal rib wear.

In the previous examples, both sample RMT steer tires have lateral slip at the edges that are below the limit of 0.006 inches. The slip values indicate a low potential for internal rib wear.

Based on the previous data, a the conclusion was reached that when the maximum lateral rib edge slip is typically below 0.004 inches and rarely exceeds 0.006 inches for RMT steer tires, they will typically not develop internal rib wear.

Example of RMT Steer Tires That Do Typically Develop Internal Rib Wear

In the following examples, tests were conducted on two series of RMT steer tires that do typically develop internal rib wear, FIG. 8 illustrates the inboard ribs-outer edges of two sample RMT steer tires, Tire C and Tire D, which typically develop internal rib wear. Both sample tires have lateral slip at the edges that generally exceeds 0.006 inches. This indicates a high potential for internal rib wear, as is the case.

FIG. 9 illustrates the inboard ribs-inner edges of the same two sample RMT steer tires, Tire C and Tire D, which typically develop internal rib wear. Both sample tires have lateral slip at the edges that generally exceed 0.006 inches. This indicates a high potential for internal rib wear, as is the case.

FIG. 10 illustrates the center rib-outer edges of the same two sample RMT steer tires, Tire C and Tire D, which typically develop internal rib wear. Both sample tires have lateral slip at the edges that generally exceed 0.006 inches. This indicates a high potential for internal rib wear, as is the case.

Based on the previous data for RMT steer tires that typically develop internal rib wears the following conclusions were reached.

Maximum lateral rib edge slip often exceeds 0.006 inches on these tires. This appears to be a good guideline value for determining if a tire is prone to internal rib wear mechanisms such as river wear and/or depressed internal rib wear.

The worst locations tend to be the inner shoulder edges, inner inboard rib edges, and the center rib edges. These areas frequently have lateral rib edge slip in excess of 0.006 inches.

Comparison of actual RMT steer tire abnormal wear with measured lateral rib edge slip data indicates that where the lateral rib edge slip exceeds 0.006 inches the tire will generally exhibits a greater propensity for abnormal tread wear in actual use. Comparison data also indicates that the greater the measured rib edge slip exceeds the 0.006 inches limit, the greater the abnormal wear in actual use. The greater the value of lateral rib edge slip, the greater the propensity for irregular tread wear in actual service. Based upon collected lateral rib edge slip data, the acceptable range of lateral rib edge slip should be less than 0.010 inches, preferably less than about 0.008 inches and most preferably less than 0.006 inches.

The above described testing method provides an empirical tool that may be used in the development of RMT steer tires whereby internal lateral rib edge slip and its resulting abnormal tread wear issues may be avoided or reduced.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described inventive components the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A method for predicting the propensity for a RMT steer tire to have irregular tire tread wear, comprising the steps of:
    a) providing a RMT steer tire to be tested;
    b) placing measurement points upon the ground engaging surface of selected circumferential tread ribs of the tread of the RMT steer tire;
    c) progressively rolling the RMT steer tire across a first planar side of a transparent plate whereby the progressive movement of a footprint image of the RMT steer tire is imposed upon the first planar side of the transparent plate;
    d) recording the progressive movement of the marked measurement points in the footprint image of the RMT steer tire imposed upon the first planar side of the transparent plate;
    e) determining the amount of lateral movement of each of the marked measurement points in the footprint image; and
    f) if any measurement points exhibit lateral movement beyond 0.010 inches predicting that the RMT steer tire will have irregular tire tread wear.

2. The method of claim 1 wherein step b includes placing measurement points adjacent selected inner and outer edges of the circumferential tread ribs of the RMT steer.

3. The method of claim 2 wherein step b includes placing measurement points adjacent selected inner and outer edges of in-board circumferential tread ribs of the RMT steer.

4. The method of claim 3 wherein step f includes if any measurement points adjacent selected inner and outer edges of in-board circumferential tread ribs exhibit lateral movement beyond 0.008 inches, predicting that the RMT steer tire will have irregular tire tread wear.

5. The method of claim 4 wherein step f includes if any measurement points adjacent selected inner and outer edges of in-board circumferential tread ribs exhibit lateral movement beyond 0.006 inches, predicting that the RMT steer tire will have irregular tire tread wear.

6. The method as claimed in claim 1 wherein step c) includes progressively rolling the RMT steer tire across a first planar side of a transparent plate at the linear velocity of one mile per hour.

7. The method as claimed in claim 1 wherein the step of recording the progressive movement of the marked measurement points includes photographically recording the progressive movement of the RMT steer tire footprint image from upon the first planar side of the transparent plate from an opposite, second planar side of the transparent plate as the footprint traverses the transparent plate.

8. The method as claimed in claim 7 further including the step of sending the photographic recording of to a computer analysis system for analyzing the progressive translation movement of the marked measurement points through the footprint of the RMT steer tire.

9. The method as claimed in claim 1 wherein step c includes providing a Dynamic Footprint Machine having the planar transparent plate embodied therein.

* * * * *